(12) United States Patent
Peterson, III

(10) Patent No.: US 6,798,391 B2
(45) Date of Patent: Sep. 28, 2004

(54) WEARABLE COMPUTER SYSTEM

(75) Inventor: Frederick A. Peterson, III, Centreville, VA (US)

(73) Assignee: Xybernaut Corporation, Fairfax, VA (US)

(*) Notice: Subject to any disclaimer, the term of this patent is extended or adjusted under 35 U.S.C. 154(b) by 0 days.

(21) Appl. No.: 09/752,653

(22) Filed: Jan. 2, 2001

(65) Prior Publication Data

US 2002/0084990 A1 Jul. 4, 2002

(51) Int. Cl.$^7$ .............. G09G 5/00; H05K 5/00; H04R 5/02
(52) U.S. Cl. .............. 345/8; 361/683; 381/301
(58) Field of Search .............. 345/7, 8, 9; 361/683, 361/685, 686, 730, 679, 680, 724, 727; 381/301, 376, 309, 373, 385, 370; 340/555, 557, 600, 980; 250/206.2, 216, 214 A, 225, 336.1

(56) References Cited

U.S. PATENT DOCUMENTS

| | | | |
|---|---|---|---|
| 4,715,367 A | * 12/1987 | Crossley | 600/27 |
| 4,786,966 A | * 11/1988 | Hanson et al. | 224/181 |
| 4,878,046 A | * 10/1989 | Smith | 340/980 |
| 5,003,300 A | 3/1991 | Wells | 340/705 |
| 5,162,828 A | 11/1992 | Furness et al. | 353/122 |
| 5,265,624 A | * 11/1993 | Bowman | 128/848 |
| 5,285,398 A | 2/1994 | Janik | 364/708.1 |
| 5,305,244 A | 4/1994 | Newman et al. | 364/708.1 |
| 5,416,310 A | * 5/1995 | Little | 2/102 |
| 5,491,651 A | 2/1996 | Janik | 364/708.1 |
| 5,510,771 A | * 4/1996 | Marshall | 340/573.4 |
| D371,549 S | 7/1996 | Ronzani et al. | D14/114 |
| 5,555,490 A | * 9/1996 | Carroll | 361/686 |
| 5,572,401 A | * 11/1996 | Carroll | 361/683 |
| 5,617,477 A | * 4/1997 | Boyden | 381/309 |
| 5,680,465 A | * 10/1997 | Boyden | 381/309 |
| 5,749,324 A | * 5/1998 | Moore | 119/719 |
| 5,815,579 A | * 9/1998 | Boyden | 381/301 |
| 5,844,824 A | 12/1998 | Newman et al. | 364/708.1 |
| 5,914,661 A | * 6/1999 | Gross | 250/206.2 |
| 5,942,954 A | * 8/1999 | Galiana et al. | 351/209 |
| 5,953,434 A | * 9/1999 | Boyden | 381/301 |
| 6,047,301 A | * 4/2000 | Bjorklund et al. | 708/139 |
| 6,137,675 A | * 10/2000 | Perkins | 361/679 |
| 6,167,413 A | * 12/2000 | Daley, III | 345/8 |
| 6,181,237 B1 | * 1/2001 | Gehlot | 340/407.1 |
| 6,249,427 B1 | * 6/2001 | Carroll | 361/683 |
| 6,324,053 B1 | * 11/2001 | Kamijo | 2/264 |
| 6,441,778 B1 | * 8/2002 | Durst et al. | 342/357.07 |
| 6,463,327 B1 | * 10/2002 | Lurie et al. | 607/42 |

FOREIGN PATENT DOCUMENTS

WO   WO95/11473 A1   4/1995   .......... G02B/27/00

* cited by examiner

Primary Examiner—Bipin Shalwala
Assistant Examiner—Jeff Piziali
(74) Attorney, Agent, or Firm—James J. Ralabate, Esq.; Christopher Tucker, Patent Agt.

(57) ABSTRACT

This invention involves a wearable computer having computer components movably located in a collar that the user wears around his or her neck. The computer components can be a display or monitor, or a microphone or any other computer component.

23 Claims, 3 Drawing Sheets

WEARABLE COMPUTER SYSTEM

This invention relates to a computer system and more specifically, to a wearable hands-free computer system.

BACKGROUND OF THE INVENTION

There are known computers that have been used and disclosed involving wearable computers and computer components. The feature of these prior art computers is that they permit the user to have freedom to use his or her hands for repairing or other functions while using a fully functional computer. One of the most commercially successful and well known of these computers is the Mobile Assistant® available from Xybernaut Corporation of Fairfax, Va. Mobile Assistant® is a registered trademark of Xybernaut Corporation.

U.S. Pat. No. 5,844,824 and 5,305,244 (Newman, et al.) describe the details of the Mobile Assistant® and fully disclose the components and function of such user-supported computers. U.S. Pat. No. 5,844,824 also describes and claims further improvements and modifications to the Mobile Assistant®.

Also disclosing wearable computers are U.S. Pat. Nos. 5,285,398 (Janik I) and U.S. Pat. No. 5,491,651 (Janik II). Both of these patents disclose a belt computer containing the elements or components of a computer. In Janik I, the plurality of computing elements are located on the belt and a flexible signal relaying means connects all of the elements for computing. A protective covering is used for enclosing said computer elements. In Janik II, a similar belt computer is described and claimed in which the signal relaying means, the length of which between any two computing elements, is greater than the length of the wearable member between any two computing elements. In both Janik I and Janik II, the flexible wearable computer is in the form of a relatively heavy belt comprising around its periphery sequentially positioned computer elements.

In both Newman, et al patents and Janik I and II, a body-worn computer is disclosed that has utility only with head mounted or flat panel displays as part of a body-worn mobile computer. Both the disclosures of U.S. Pat. Nos. 5,305,244 and 5,844,824 are incorporated by reference in the present disclosure.

Head mounted viewing systems for viewing a plurality of displays are known. Some of these prior art display units are disclosed in U.S. Pat. Nos. 5,003,300, 5,162,828, and D371, 549 and in PCT International Publication No. WO95/11473 published Apr. 27, 1995. Each of the systems described involve a relatively heavy head mounted display connected to a remote or other signal source for providing the subject matter to be displayed.

In Wells, U.S. Pat. No. 5,003,300, a somewhat cumbersome head mounted display is disclosed which is connected to a remote signal source which may be a computer pocket calculator or a radio wave transmitter which provides power, timing information and drawing signals necessary for driving the display. The system of Wells is not a voice-activated system but rather one that relies upon stored information for driving the display. Thus, Wells does not contain voice activation means in the head-mounted display.

The Furness patent U.S. Pat. No. 5,162,828 discloses a display system for conventional eyewear using a transparency. The display system of Furness is somewhat complicated and includes a light transmissive display mounted on the frame of the eyewear and optics for collimating light to project an image of the displayed information at a distance from the user in the periphery of the field of view defined by the transparency. It is important to the Furness head mounted display that there be included a mirror means for collimated light to project the image. Again, Furness' system is not designed for use in or with a voice activated computer system.

The Ronzani design patent U.S. Patent No. Des. 371,549 illustrates a head mounted display system having a movable eyepiece or cell that appears to be capable of both horizontal and vertical adjustment. Nothing in Ronzani, however, suggests use of his head mounted display system in a voice activated computer system.

The WO95/11473 publication (Fan, et al) dated Apr. 27, 1995 discloses a multitude of head mounted display configurations. In some of the embodiments disclosed by Fan the display is connected to a video or information source such that the user can view information or images shown on the display. In one of Fan's embodiments, the display can be mounted to a frame so that the user can move the display in and out of the user's field of view. Some of the illustrations in Fan present a head-mounted display containing earphones and a microphone connected to or integral therewith. The microphone is used to convey voice activation commands to the computer for ultimate transmission to the display means used. In Fan, the earphones are hinged to the head band 512 and attached to one of the earphones as a microphone arm 690 having a microphone 559 attached at its distal end. It is important to note that Fan uses two earphones, both of which are permanently attached to the headset structure; see Fan FIGS. 34A through 34D. The headset of these figures is clamped over the head and pressure exerted on each ear portion in order to hold the headset in place on the wearer's head. In all of these systems, the display is worn on the head of the user, which could become fatiguing after extended wearing.

There is therefore a need for a head display system, usable in or with voice activated computer systems that are as non-intrusive as possible, convenient to use, are compact, lightweight and fully adjustable.

SUMMARY OF THE INVENTION

It is therefore an object of this invention to provide a wearable computer system devoid of the above noted disadvantages.

Another object of this invention is to provide a novel collar that users can wear wherein the collar contains at least the earphone(s), display unit and microphones.

Still a further object of this invention is to provide a novel voice activated wearable computer system containing the previously noted collar.

Yet another object of this invention is to provide a lightweight and more comfortable display unit and earphone (s) for a wearable computer system.

Another still further object of this invention is to provide a wearable monitor and microphone less obtrusive than the head mounted displays used in the prior art.

Still a further object of this invention is to provide an article of clothing that contains components of a wearable voice-activated computer in its collar.

These and other objects of this invention are accomplished by a novel system used in voice activated wearable computers where some of the computer components are located and housed in a wearable collar. The collar contains at least the display, earphone or earphones, and microphone. The monitor or display can be positioned in the collar so that it can be used adjacent to either eye. Also, either one or two earphones may be used as desired. The microphone can be a separate unit or can be attached to the monitor, whichever is more convenient. The hinged arms that support each component in the collar are curved to conform to the outline of the collar and the user's neck. The hinges provide means whereby the supporting arms can be easily adjusted when in use. In place of a hinged arm, any suitable other supporting arm or device may be used, such as telescoping arms that can be adjusted to suit the user's preference. By placing these components in a user's collar, they are out of the way when not in use and are easily released from the collar when it is desired to be used. The collar contains and houses the total audio/video component of a wearable voice activated computer. This is an important improvement over the cumbersome, heavy, fragile and sometimes awkward head or wrist-mounted displays of the prior art. A bonus effect of the collar is that it protects the housed computer components from the elements, weather or other damaging means. The collar can be worn alone, under or as part of normal garments, such as a shirt, sweater, vest or jacket. A mini display is used on a flexible arm made of a cable or flexible wire or telescoping arm or any other suitable support. The display can be any suitable monochromic or color display. The housed components can be positioned for optimal utility by the wearer and may be auto-switched "on/off" by extraction or set to standby or permanent "on" for immediate use on extraction by any mechanical, voice activated or other means. Extractable microphone (noise canceling or directional) is similarly configured in the opposite side of the collar. Pouches on either side of the collar may optionally be used which will store over-ear pieces and interior wire port for optional bone conduction audio device, and a neoprene-like, or other noise reducing over-ear cover similar to an over-the-ear cell phone ear piece. A video camera device maybe mounted on the body at or near the thorax-center, and is extendable and/or detachable. Remote camera using RF or Bluetooth technology may be mounted anywhere on the body or even apart from the body on equipment. The components of the wearable computer of this invention may be connected by hard wire connection or by wireless connection.

In a preferred embodiment of this invention, communication means such as cell phones, telephones, radios or other means are in electrical connection and may be used with the components described. Also, the earphone(s) and microphone of this invention can act as the cell phone or other communication means thereby being built in. Also, the collar of this invention can be used in armor applications.

DETAILED DESCRIPTION OF THE DRAWING AND PREFERRED EMBODIMENTS

Figure 1:
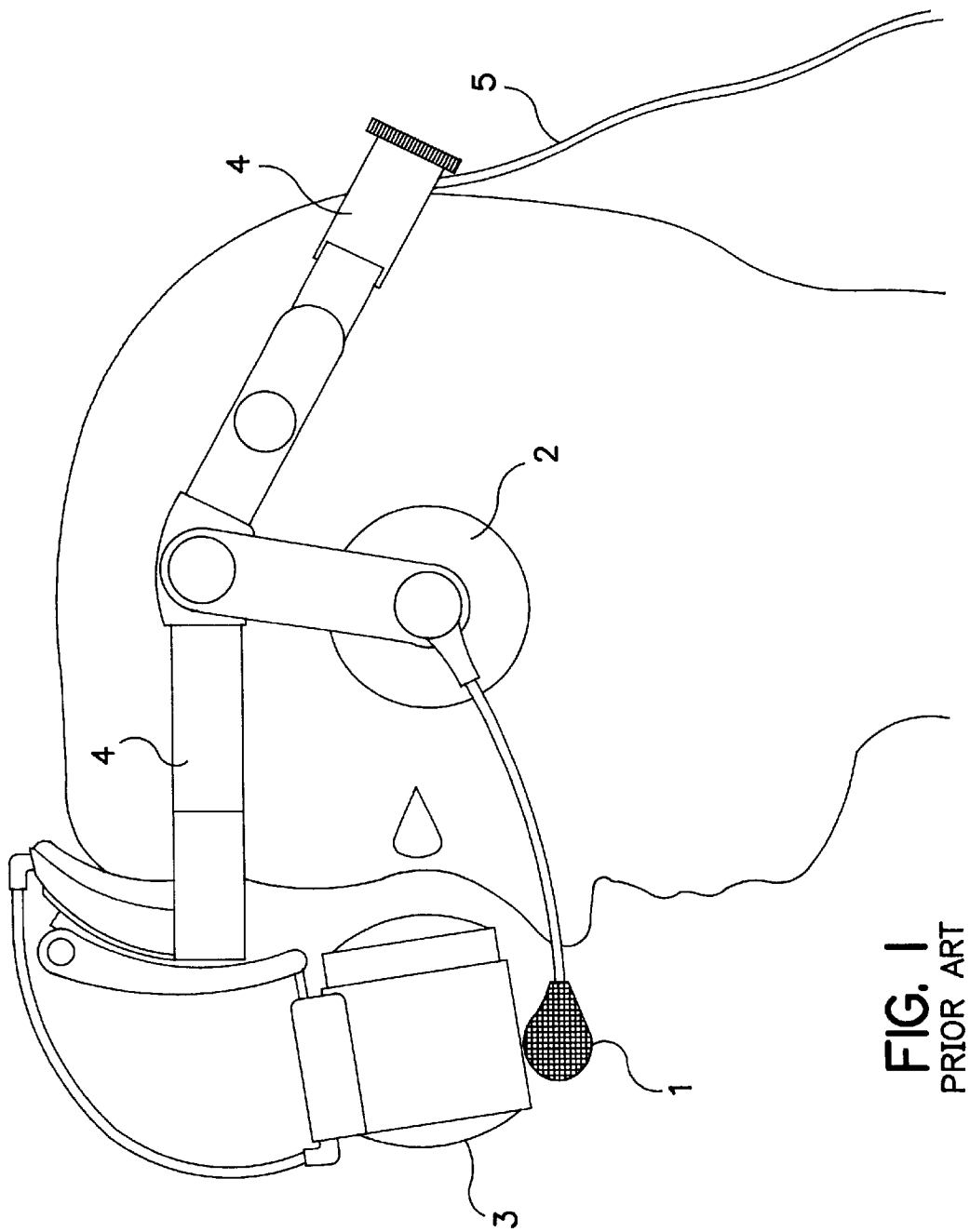
FIG. 1 is a plan view of the head-mounted display used in the prior art wearable computer systems.
Figure 2:
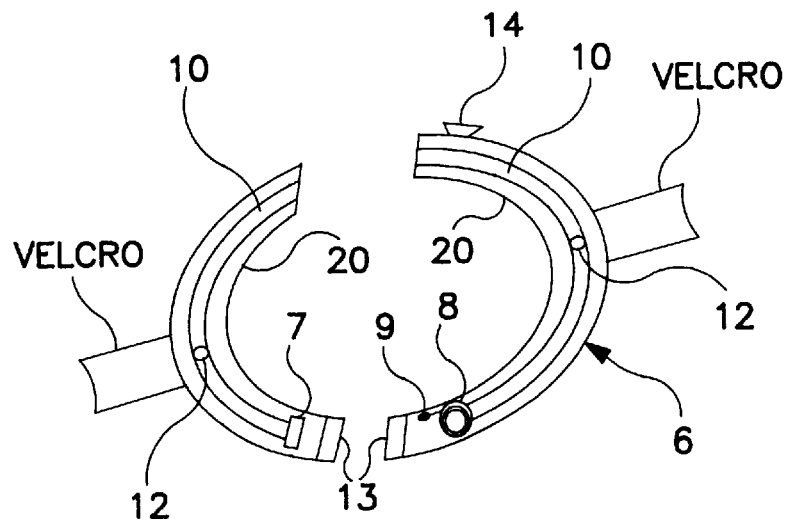
FIG. 2 is a top plan view of the collar of this invention, which houses the earphone(s), monitor, and microphone(s) of the present system.
Figure 3:
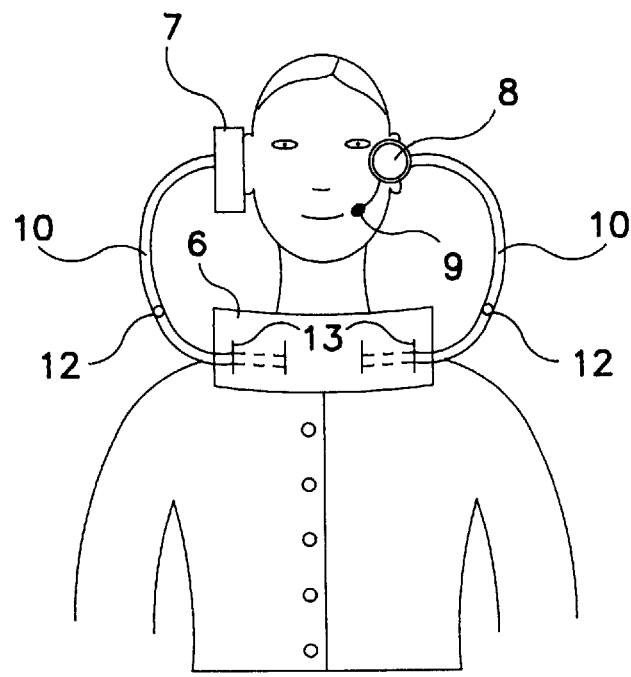
FIG. 3 is a front plan view of a user wearing the collar of this invention.

In FIG. 1 the head-mounted display (HMD) of the prior art is shown. In this prior art HMD, a microphone 1 is attached to an earphone or earpiece 2. The monitor 3 is suspended from a headband 4 which fits around the user's head. After continued use, the wearer could find this HMD uncomfortable and obtrusive. Also, cables 5 that connect the HMD to the computer and processor can be awkward and sometimes get in the way of the user, or even caught on surrounding material, environment, equipment, etc. In FIG. 2, the collar 6 of this invention is shown. The collar 6 houses an earphone 7 and a monitor 8 in addition to a microphone 9. Said microphone 9 may possess more than one actual audio transducer for performing noise cancellation. The stiffness of collar 6 provides a good sturdy foundation to support the enclosed components (i.e., earphone(s), monitor, or display and microphone). The arms 10 supporting the display 8 and earpiece 7 are hinged (in one embodiment) to be easy to use. The components 7, 8 and 9 in collar 6 are in electrical connection to the computer (CPU) and battery. These electrical connections can be hard wire fiberoptics or wireless. The detachable collar of FIG. 2 can have Velcro fasteners 11 or any other clothing connection means to be used to attach to articles of clothing, if desired. When housed in the collar 6, each arm 10 (supporting the components 7, 8 and 9) is curbed to conform to the outline of the user's neck. A hinge 12 can be used to make adjustments of each component easy during use or storage in the collar. The arms 10 may also be a flexible cable or neck such as those used in goose-necked lamps. The collar can be made from any suitable and comfortable material and has openings 13 through which the arms 10 extend when in use. These openings 13 can be a zippered opening, a slot opening, a Velcroed opening or any other suitable opening through which the arms 10 extend when in use. It may be desirable to utilize cooling or heating in the collar 6. The cooling could be a material for dissipating heat or moisture, or there could be a bladder containing a heat dissipating liquid. The heating could be a insulating material or even active heating provided by an external power source integral to the collar 6. The back of the collar 6 has an electrical connection 14 for connection to a cable (internal preferred) which connects the components 7, 8 and 9 to a CPU, battery, etc. Obviously components 7, 8 and 9 are in electrical connection to each other. As noted earlier, all electrical connections 15 can be internal to clothing, external to clothing, hard wired, wireless or any other suitable means. After use, the arms 10 are refolded and reinserted into the collar 6.

The earpiece 7 can preferably be an ear plug so that it can more easily be housed in the collar 6. The earpiece or earphone 7 shown in the drawing is enlarged for illustration and clarity purposes. Also, the monitor 8 is shown enlarged in the drawing for clarity purposes only. It in fact, would be a miniature display or monitor so it too can easily fit in the collar 6. The microphone 9 is also preferably a miniature embodiment.

Figure 4:
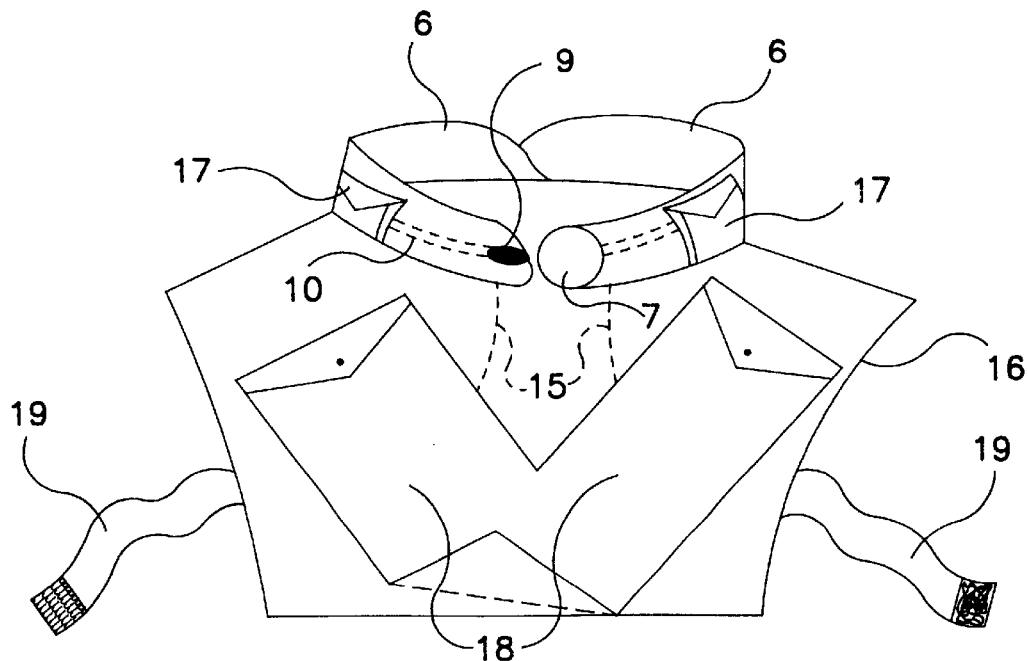
FIG. 4 is a front plan view of an embodiment where a garment containing the collar of this invention is used.
Figure 5:
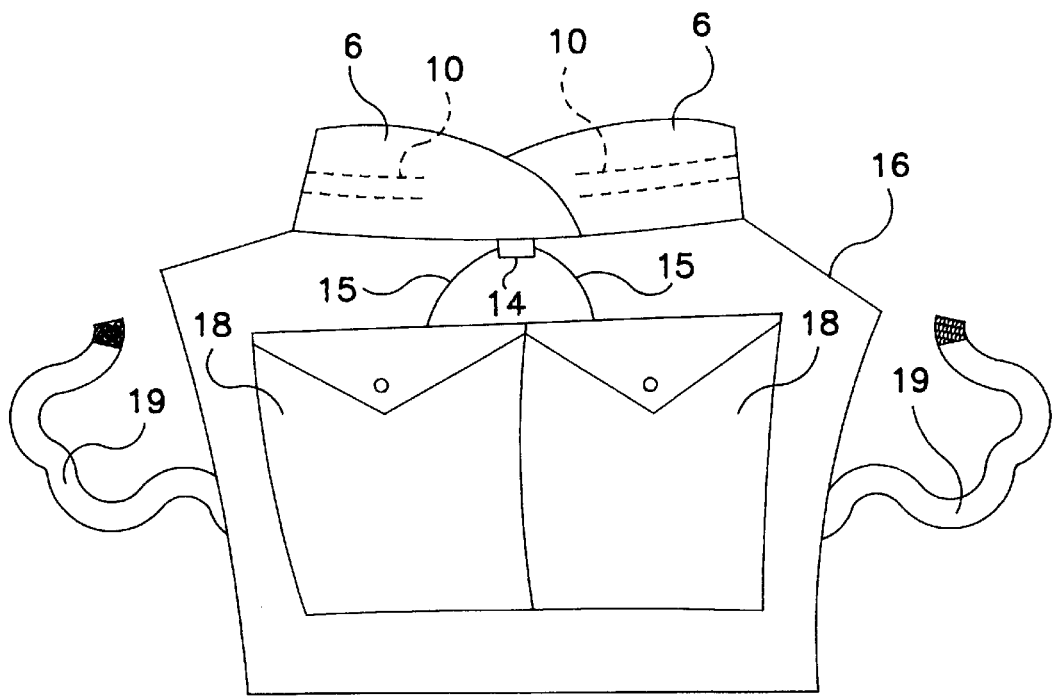
FIG. 5 is a back plan view of an embodiment wherein a wearable garment is used with the collar of this invention.

An embodiment of a system of this invention where the collar 6 is attached to an article of clothing 16 is shown in FIGS. 4 and 5. The front of the dickey 16 is shown in FIG. 4 whereby the earphone 7, monitor 8 and microphone 9 are all tucked inside of collar 6. Optionally, collar 6 can have earphone pouches 17 for additional room to house the earphone 7. Dickey 16 can have pockets or pouches 18 to house a CPU, battery or other computer component. An adjustable strap 19 is used to secure dickey 16 to the user's body. Pockets 18 may be used in front or in back of dickey 16 or both front and back. FIG. 5 shows the dickey 16 attached to collar 6 with optional rear pockets 18 for CPU or battery or any other computer component. The pockets 18 could have ports if desired into which peripherals can be connected. By "conventional computer" or "general purpose" is meant a computer having all of the components of a conventional computer, i.e., CPU, internal storage means, memory means, activation means, display controller, input/output means, peripheral connection means, etc. The general purpose computer and voice activated computer of this invention is the type disclosed in U.S. Pat. Nos. 5,305,244 and 5,844,824.

The preferred and optimumly preferred embodiments of the present invention have been described herein and shown in the accompanying drawings to illustrate the underlying principles of the invention, but it is to be understood that numerous modifications and ramifications may be made without departing from the spirit and scope of this invention.

What is claimed is:

1. A user-supported computer system comprising a user-supported general purpose computer attached to a wearable collar, said system comprising said wearable collar having computer components longitudinally enclosed therein, said collar having means to fit around the neck of a user and comprising electrical connection means in electrical contact with said general purpose computer, said computer components movably enclosed longitudinally within said collar at a location where they can be extended outside said collar when in use and having means when used to be moved adjacent said user's face, wherein said user-supported general purpose computer includes an enclosure containing central processing unit, internal storage, memory, display controller, input/output connectors, peripheral connection ports.

2. The system of claim 1 wherein said computer components are selected from the group consisting of a display, at least one earphone, a microphone and mixtures thereof.

3. The system of claim 2 wherein said at least one earphone and said microphone are enabled to function as a cellular phone.

4. The system of claim 2 wherein said at least one earphone and said microphone are enabled to function as a radio.

5. The system of claim 1 wherein said computer is enabled to be activated from the group consisting of voice activation.

6. The system of claim 1 wherein said collar is attached to a separate article of clothing.

7. The system of claim 1 wherein said collar is attached to a separate article of clothing, said article of clothing having means in electrical contact with said collar and said computer components enclosed therein.

8. The system of claim 1 wherein said computer components are supported by adjustable arms, said collar having means for said arms to extend through said collar.

9. The system of claim 1 wherein said collar has connection means for attachment to additional pieces of clothing.

10. The system of claim 2 wherein said at least one earphone are supported by a flexible supporting arm, and whereby said display is supported by a separate supporting arm.

11. A user-supported voice activated hands-free computer system comprising a user-supported conventional computer and a collar in electrical connection to said conventional computer, said collar comprising means to longitudinally enclose and to provide electrical contact to computer components enclosed therein, said computer components movably enclosed within said collar at a position where they can be extended outside said collar to be positioned in contact with or adjacent to the face of the user, wherein said user-supported general purpose computer includes an enclosure containing central processing unit, internal storage, memory, display controller, input/output connectors, peripheral connection ports.

12. The system of claim 11 wherein said collar is configured to fit around the periphery of the neck of the user.

13. The system of claim 11 wherein said collar is configured for support by the shoulders of the user.

14. The system of claim 11 wherein said computer components are selected from the group consisting of a display, at least one earphone, and a microphone and mixtures thereof.

15. The system of claim 11 wherein said collar is attached to a separate article of clothing.

16. The system of claim 11 wherein said collar is attached to a separate article of clothing, said article of clothing having means in electrical contact with said collar and said computer computers enclosed within.

17. The system of claim 11 wherein said computer components are supported by adjustable arms, said collar having means for said arms extend through said collar.

18. The system of claim 11 wherein said collar has connection means for attachment to additional pieces of clothing.

19. The system of claim 14 wherein said at least one earphone are supported by a flexible supporting arm and wherein said display is supported by a separate supporting arm.

20. A user-supported computer system comprising a general purpose computer that is user-supported and a wearable dickey in electrical connection to said general purpose computer, said dickey having attached thereto a collar configured to fit around the neck of a user, said collar also comprising means for electrical contact with said general purpose computer and movable enclosed within said collar are computer components selected from the group consisting of a display means, at least one earpiece, a microphone and mixtures thereof, said dickey having components to house said general purpose computer, wherein said user-supported general purpose computer includes an enclosure containing central processing unit, internal storage, memory, display controller, input/output connectors, peripheral connection ports.

21. The system of claim 20 wherein said dickey has internal wiring to electrically connect computer component of said system.

22. A user-supported computer system comprising a user-wearable detachable collar, said collar comprising computer system components housed therein, said components configured to conform to an outline of said user's neck and having openings therein where said components can outwardly extend when said computer system is in use, wherein said user-supported general purpose computer includes an enclosure containing central processing unit, internal storage, memory, display controller, input/output connectors, peripheral connection ports.

23. The system of claim 22 wherein said components are selected from the group consisting of a display, at least one earphone, and a microphone and mixtures thereof.

* * * * *